Jan. 22, 1924.
A. M. CAUSSE
1,481,690
VEHICLE WHEEL
Filed March 29, 1922
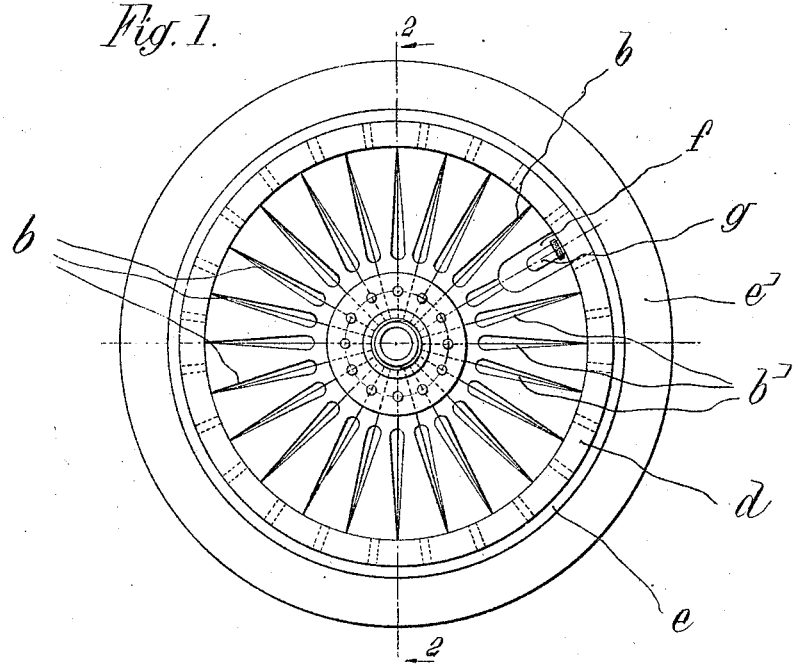
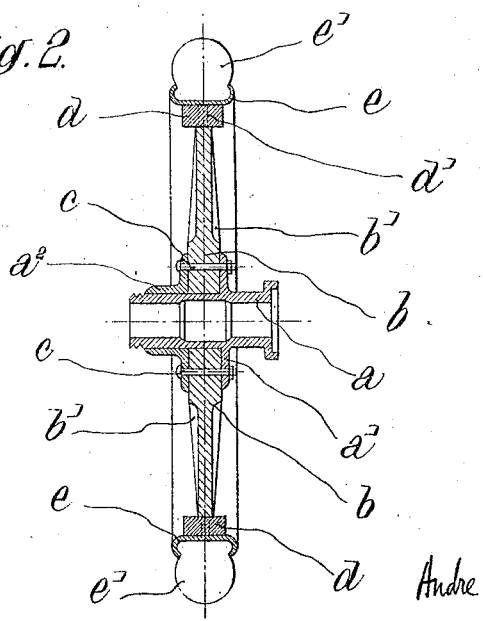

Patented Jan. 22, 1924.

1,481,690

UNITED STATES PATENT OFFICE.

ANDRÉ MARIUS CAUSSE, OF PARIS, FRANCE.

VEHICLE WHEEL.

Application filed March 29, 1922. Serial No. 547,699.

*To all whom it may concern:*

Be it known that I, ANDRÉ MARIUS CAUSSE, a citizen of the French Republic, residing at Paris, France, have invented certain new and useful Improvements in Vehicle Wheels, of which the following is a specification.

This invention relates to vehicle wheels and refers more particularly to those provided with wooden spokes.

It has for its object to enable wheels of the kind in question to be so constructed, that they have an artistic appearance and can be easily cleaned.

According to the invention, the spokes of the wheel are so shaped that when fitted together they form a continuous whole, the said spokes being preferably provided with grooved out or cut away portions in order to lighten the wheel.

The invention also includes certain minor constructional details which will be more fully described hereafter.

It includes also certain practical embodiments of the invention, and as new industrial products, wheels of the kind in question provided with the improvements, and special parts suitable for their construction.

In order that the said invention may be clearly understood it will now be described with reference to the accompanying drawing, which description and drawing, however, are given merely by way of example.

Figs. 1 and 2 of the drawing show respectively, in front elevation, and in cross section on the line 2—2, of Fig. 1 a wheel constructed according to the invention.

The construction of a wheel, provided with wooden spokes and made according to the invention is substantially as follows:—

$a$ is a hub comprising a fixed flange $a^1$ and provided with a movable flange $a^2$, the construction being such that the inner ends of the spokes $b$, which are direct by adjacent the hub, can be clamped between the fixed and movable flanges. The removable flange may be kept in place in any suitable manner, for instance by means of bolts $c$.

$d$ is a wooden felly, to which the rim $e$ is attached. This rim may be a simple iron hoop, but it is preferably a metallic rim adapted to carry a pneumatic tyre $e^1$.

On the inner surface of the felly $d$ are provided recesses $d^1$, engaged by tenons at the outer ends of the spokes $b$.

According to the special feature of the invention I form the spokes $b$, which are to be fitted between the hub $a$ and the felly $d$ of flaring contour so that they can be fitted together with the lateral edges of the two adjacent spokes coming into contact throughout the whole length of the spokes, and so that when all the spokes are fitted in position they constitute a wheel body with a continuous surface.

In order to lighten the wheel thus constituted and to give it a more artistic appearance, I provide in the said spokes, preferably at their lateral edges, grooved out or recessed portions $b'$. These may for example commence at a distance from the centre of the wheel slightly greater than the radius of the flange of the hub, and terminate at the rim. The grooved out portion may be made to vary in size, decreasing from the centre towards the periphery.

Where the wheel is to be provided with a pneumatic tyre I so cut away the extremity of two adjacent spokes that there is left between these two spokes a space $f$ suitable for the reception of the valve $g$ of the pneumatic tyre, and adapted to enable access to be obtained to the said valve.

It is to be understood that the invention is not limited to the particular method of carrying it into effect, which has been more particularly described and shown on the accompanying drawing, but that all modifications are included coming within a fair interpretation of my claims.

What I claim and desire to secure by Letters Patent of the United States of America is:—

1. A wheel comprising a hub, a felly, a series of intermediate spoke sections secured to said hub and said felly and having a flaring contour so that said spoke sections have abutting edges intermediate said hub and felly, said spoke sections having cut-out portions adjacent said abutting edges.

2. A structure according to claim 1, in which said cut out sections are of flaring contour and have their widest portions adjacent said hub.

In testimony whereof I hereunto affix my signature.

ANDRÉ MARIUS CAUSSE.